(12) United States Patent
Song et al.

(10) Patent No.: US 12,421,390 B2
(45) Date of Patent: Sep. 23, 2025

(54) POLYMER COMPOSITIONS WITH IMPROVED ANTI-DENT AND PARTICULATE RELEASE PERFORMANCE

(71) Applicant: SHPP GLOBAL TECHNOLOGIES B.V., Bergen op Zoom (NL)

(72) Inventors: Shijie Song, Shanghai (CN); Jin Ju Jung, Gyeonggi-do (KR); Xing Liu, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 19/002,165

(22) Filed: Dec. 26, 2024

(65) Prior Publication Data
US 2025/0215220 A1  Jul. 3, 2025

(30) Foreign Application Priority Data
Dec. 29, 2023  (EP) .................................... 23220742

(51) Int. Cl.
| | | |
|---|---|---|
| *C08L 71/10* | (2006.01) | |
| *B29C 48/36* | (2019.01) | |
| *C08G 65/38* | (2006.01) | |
| *C08K 3/04* | (2006.01) | |
| *C08K 3/34* | (2006.01) | |
| *C09K 19/38* | (2006.01) | |
| *G03B 17/02* | (2021.01) | |
| *B29K 71/00* | (2006.01) | |
| *B29K 79/00* | (2006.01) | |
| *B29K 96/04* | (2006.01) | |
| *B29K 509/10* | (2006.01) | |

(52) U.S. Cl.
CPC .............. *C08L 71/10* (2013.01); *B29C 48/36* (2019.02); *C08G 65/38* (2013.01); *C08K 3/04* (2013.01); *C08K 3/346* (2013.01); *C09K 19/3814* (2013.01); *G03B 17/02* (2013.01); *B29K 2071/12* (2013.01); *B29K 2079/085* (2013.01); *B29K 2096/04* (2013.01); *B29K 2509/10* (2013.01); *B29K 2995/002* (2013.01); *B29K 2995/0041* (2013.01); *B29K 2995/0089* (2013.01); *C08G 2250/00* (2013.01); *C08L 2205/03* (2013.01); *C08L 2205/08* (2013.01); *C08L 2205/12* (2013.01)

(58) Field of Classification Search
USPC ........................................................... 528/86
See application file for complete search history.

(56) References Cited

U.S. PATENT DOCUMENTS

| | | |
|---|---|---|
| 4,404,350 A | 9/1983 | Ryang |
| 4,690,997 A | 9/1987 | Cella |
| 4,808,686 A | 2/1989 | Cella |
| 4,871,817 A | 10/1989 | Rock |
| 5,366,663 A | 11/1994 | Romer et al. |
| 6,994,896 B2 * | 2/2006 | Sethumadhavan .. H05K 1/0373 428/209 |
| 7,361,705 B2 | 4/2008 | Kawaguchi et al. |
| 10,684,932 B2 | 6/2020 | Kanamori |
| 2020/0304694 A1 | 9/2020 | Kim |

FOREIGN PATENT DOCUMENTS

| | | |
|---|---|---|
| JP | 2001-152036 A | 6/2001 |
| JP | 2007-197714 A | 8/2007 |
| WO | 2014/143716 A1 | 9/2014 |
| WO | 2021/009727 A1 | 1/2021 |
| WO | 2022/214927 A1 | 10/2022 |

OTHER PUBLICATIONS

Extended European Search Report mailed Jun. 25, 2024 in EP23220742.3 (5 pgs.).

\* cited by examiner

*Primary Examiner* — Terressa Boykin
(74) *Attorney, Agent, or Firm* — Quicker Law, LLC

(57) ABSTRACT

Compositions include from about 50 wt % to about 85 wt % of a liquid crystal polymer resin, from about 0.1 wt % to about 15 wt % of a polyetherimide polymer, from about 0.05 wt % to about 8 wt % of a compatibilizer, and from about 2 wt % to about 25 wt % of a mineral filler. A 50 mm×60 mm sample having a thickness of 0.6 mm molded from the composition exhibits an anti-dent performance characterized by a dent depth from 30-40 micrometers as measured using a three dimensional surface profiler; the sample is tested using a drop tester with a 1.6 mm diameter steel ball having a weight of 50 grams dropped from a height of 50 mm. Articles including the composition, including components of a mobile compact camera module, are also described.

15 Claims, 15 Drawing Sheets

| Type | Ball Guide | Spring & Wire |
|---|---|---|
| Structure | | |
| Settling time | (Relatively) Short | Long |
| Crosstalk | No | Yes |
| Weight Limit | Over 1000mg | Below 1000mg* |
| Power Consumption | Low | High |
| Compensation Angle | High (1.5*) | Low (1.0*) |
| Power Consumption | Low | High |
| Operation settling time | short | Long |
| Precision operation | High | Low |
| Operation impact resistance reliability | high | low (spring deformity and wire breakage occurs upon impact) |
| Weight Limit | Over 1000mg | Below 1000mg |

FIG. 1

Table 1.

| Item | Description | Supplier | Trade name |
|---|---|---|---|
| LCPA | Wholly aromatic liquid crystal polyether resin comprising repeating units derived from 4-hydroxybenzoic acid and hydroxynaphthoic acid, obtained as UENO LCP-A 5000 | UENO | A2500 |
| LCPB | Wholly aromatic liquid crystal polyether resin comprising repeating units derived from 4-hydroxybenzoic acid, hydroxynaphthaoic acid, naphthalenedicarboxylic acid, and hydroquinone obtained as UENO LCP-A 6000 | PRET | KG335 |
| PEI | Poletherimide comprising repeating units derived from 2,2-bis [4-(3,4-dicarboxyphenoxy)phenyl] propane dianhydride with metaphenylene diamine, having a weight average molecular weight of 45,000 grams per mole, as determined by gel permeation chromatography relative to polystyrene standards (ULTEM™ 1010) | SABIC | 1010 |
| MICA | Inorganic filler mica, average particle size about 25 microns | Yamaguchi | AB25S |
| CB | Carbon Black Pigment | Carbot | M800 |
| COMP | EGMA | Sumitomo | BF-E |

FIG. 2

Table 2. Temperature profiles for compounding

| Extruder | UOM | 25 mm ZSK |
|---|---|---|
| Die | – | 2 holes |
| Feed temperature | °C | 40 |
| Zone 1 temp. | °C | 180-200 |
| Zone 2-8 temp. | °C | 250-300 |
| Die temperature | °C | 250-300 |
| Screw speed | Revolutions per minute (rpm) | 300 |
| Throughput | Kilograms per hour (kg/h) | 15-25 |
| Vacuum 1 | bar | ~0.7 |

FIG. 3

Table 3. Specimen injection molding profile.

| Molding machine | UOM | Engel Molding Machine |
|---|---|---|
| Pre-drying time | Hours (h) | 3-4 |
| Pre-drying temp. | °C | 90-110 |
| Hopper temp. | °C | 40 |
| Zone 1 temp. | °C | 250-280 |
| Zone 2 temp. | °C | 265-295 |
| Zone 3 temp. | °C | 270-300 |
| Nozzle temp. | °C | 265-295 |
| Mold temperature | °C | 75-90 |
| Screw speed | rpm | 25 |
| Back pressure | bar | 7 |
| Injection time | s | 1.9 |
| Approx. cycle time | s | 45 |

FIG. 4

Table 4. formulations.

| Item Code | Item Description | Unit | CE1 Benchmark | Ex2 690030 | Ex3 690031 | Ex4 690032 | Ex5 690524 | Ex6 690525 |
|---|---|---|---|---|---|---|---|---|
| LCP B | LCP Vectra E950RX | % | 75 | | | | | |
| LCP A | LCP A2500 | % | - | 63.5 | 66.5 | 59.5 | 76.5 | 72 |
| PEI | ULTEM 1010 | % | - | 7 | 4 | 11 | 8.5 | 8 |
| MICA | Mica AB25S | % | 25 | 24.5 | 24.5 | 24.5 | 10 | 15 |
| CB | Carbon Black Pigment | % | - | 2.5 | 2.5 | 2.5 | 2.5 | 2.5 |
| COMP | Igetabond BF-E EGMA | % | 3 | 2.5 | 2.5 | 2.5 | 2.5 | 2.5 |

FIG. 5

Table 5. Tooling information for camera actuator housings.

| Tooling name | Mobile CCM Housing |
|---|---|
| Mold (mm) | 250 x 300 x 300 |
| Part size (mm) | VCM housing (12 x 12 x 7)<br>VCM carrier (10.7 x 9.9 x 6) |
| Number of cavities | 1 x 2 |
| Number of gates | 4 pinpoint gate |
| Runner type | 3 plate + cold runner |

FIG. 7

Table 6. Particle release measurements.

| Variable | Sample | N | Mean | SE Mean | StDev | Median |
|---|---|---|---|---|---|---|
| LCP+MF2 5% | CE1 | 5 | 3758 | 299 | 669 | 3744 |
| 690030 | EX2 | 5 | 3058 | 282 | 630 | 3236 |
| 690031 | EX3 | 5 | 3128 | 149 | 334 | 3182 |
| 690032 | EX4 | 5 | 3153 | 157 | 352 | 3231 |
| 690524 | EX5 | 5 | 3183 | 231 | 516 | 2993 |
| 690525 | EX6 | 5 | 1748 | 241 | 540 | 1575 |

FIG. 8

Table 7. Anti-dent performance.

| Variable | Sample | N | Mean | SE Mean | StDev | Median |
|---|---|---|---|---|---|---|
| LCP+MF 25% | CE1 | 10 | 97.70 | 5.69 | 18.00 | 95.00 |
| 690030 | EX2 | 10 | 98.50 | 5.71 | 18.06 | 100.00 |
| 690031 | EX3 | 10 | 81.80 | 9.19 | 29.05 | 90.50 |
| 690032 | EX4 | 10 | 103.3 | 11.2 | 35.5 | 103.5 |
| 690524 | EX5 | 10 | 35.00 | 3.41 | 10.77 | 32.50 |
| 690525 | EX6 | 10 | 50.40 | 9.26 | 29.28 | 39.50 |

FIG. 11

POLYMER COMPOSITIONS WITH IMPROVED ANTI-DENT AND PARTICULATE RELEASE PERFORMANCE

CROSS-REFERENCE TO RELATED APPLICATION

This application claims priority to and the benefit of European Application No. 23220742.3 filed Dec. 29, 2023, the disclosure of which is incorporated herein by this reference in its entirety.

FIELD OF THE DISCLOSURE

The present disclosure relates to liquid crystalline polymer compositions that provide enhanced anti-dent performance for certain applications, including compact camera modules.

BACKGROUND

Liquid crystalline polymers ("LCP") are a class of polymers well known for a variety of uses. LCPs are often thermoplastic polymers, although they can also be used as thermosets by functionalization or by compounding with a thermoset such as an epoxy. These polymers can provide a desirable combination of properties for a wide variety of applications. Despite exhibiting many advantages, such as dielectric and barrier properties, the use of liquid crystalline polymers can be limited by a lack of adequate melt strength and poor processability. More specifically, LCPs can have narrow processing windows, and films formed from liquid crystalline polymers can have poor tear strength in the machine direction, as well as low yield during film making and assembly processes. Recently, attempts have been made to exploit the benefits of liquid crystalline polymers having a high heat resistance for the molded parts of a compact camera module (CCM). Compact camera modules ("CCM") are often employed in mobile phones, laptop computers, digital cameras, digital video cameras, etc. that contain a plastic lens barrel disposed on a base. One of the components of a CCM is a ball guide actuator. This component is susceptible to denting and would be better formed by a material that can resist these dents on impact.

Accordingly, there remains a need in the art for liquid crystalline polymer based materials suitable that exhibit improved anti-dent and fracture performance suitable for application in a compact camera module.

SUMMARY

Aspects of the disclosure relate to compositions including: from about 50 wt % to about 85 wt % of a liquid crystal polymer resin; from about 0.1 wt % to about 15 wt % of a polyetherimide polymer; from about 0.05 wt % to about 8 wt % of a compatibilizer; and from about 2 wt % to about 25 wt % of a mineral filler. The combined weight percent value of all components does not exceed 100 wt %, all weight percent values are based on the total weight of the composition. A 50 mm (millimeter)×60 mm sample having a thickness of 0.6 mm molded from the composition exhibits an anti-dent performance characterized by a dent depth from 30-40 μm (micrometers) as measured using a three dimensional surface profiler, wherein the sample is tested using a drop tester with a 1.6 mm diameter steel ball having a weight of 50 grams dropped from a height of 50 mm.

Further aspects of the disclosure relate to methods of forming a composition, the method including: (a) combining, to form a mixture, (i) from about 50 wt % to about 85 wt % of a liquid crystal polymer resin, (ii) from about 0.1 wt % to about 15 wt % of a polyetherimide polymer, (iii) from about 0.05 wt % to about 8 wt % of a compatibilizer, and (iv) from about 2 wt % to about 25 wt % of a mineral filler; and (b) extruding the mixture to form the composition. The combined weight percent value of all components does not exceed 100 wt %, and all weight percent values are based on the total weight of the composition. A 50 mm×60 mm sample having a thickness of 0.6 mm molded from the composition exhibits an anti-dent performance characterized by a dent depth from 30-40 micrometers as measured using a three dimensional surface profiler, wherein the sample is tested using a drop tester with a 1.6 mm diameter steel ball having a weight of 50 grams dropped from a height of 50 mm.

The above described and other features are exemplified by the following detailed description, examples, and claims.

BRIEF DESCRIPTION OF ILLUSTRATIVE ASPECTS

The accompanying figures, which are incorporated in and constitute a part of this specification, illustrate several aspects and together with the description service to explain the principles of the of the disclosure.

FIG. 1 is a diagram showing the differences between a ball guide and a spring-and-wire configuration for a compact camera module.

FIG. 2 presents Table 1 showing the materials used to prepare formulations.

FIG. 3 presents Table 2 showing the temperature profiles for compounding.

FIG. 4 presents Table 3 showing the injection molding profile.

FIG. 5 presents Table 4 showing the formulations prepared.

FIG. 6A shows a VCM housing and VCM carrier, and FIG. 6B shows the assembled part.

FIG. 7 presents Table 5 showing the tooling information for the housings.

FIG. 8 presents Table 6 showing the particle release measurements obtained.

FIG. 11 presents Table 7 showing the anti-dent performance observed.

Figure 12:
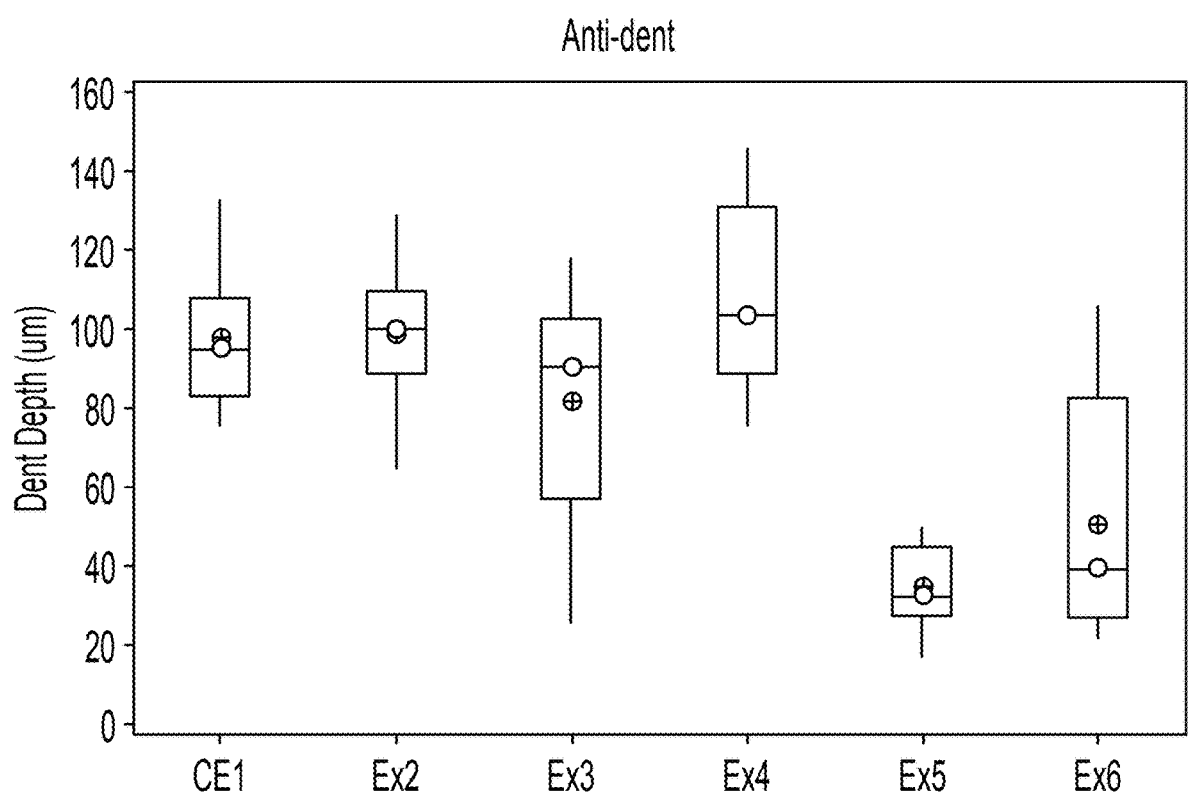

FIG. 12 is a graphical representation of the anti-dent performance.

FIGS. 13A-13D are SEM images of an LCP/PEI formulation.

Figure 14:
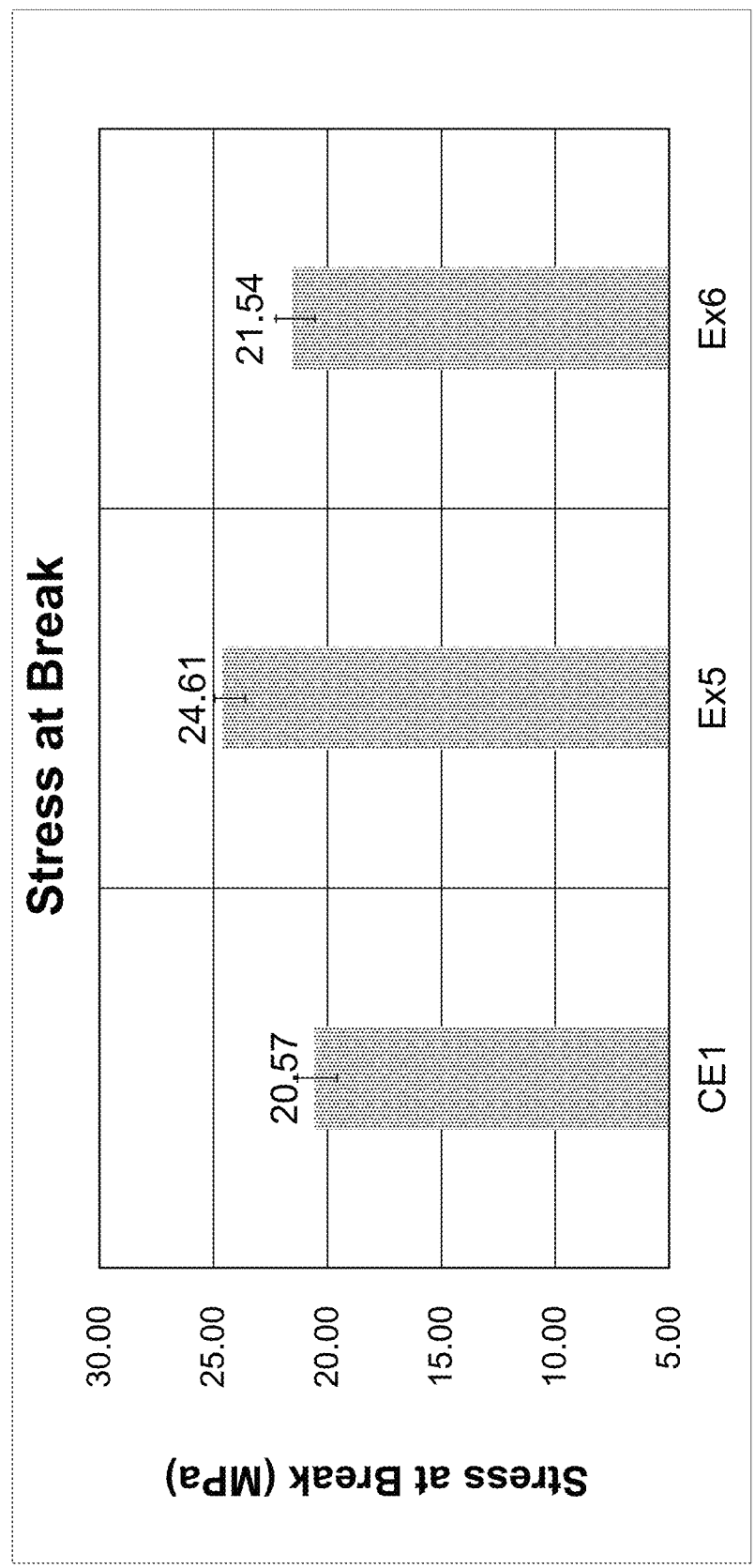

FIG. 14 is a graph of weldline strength for CE1, Ex5, and Ex6.

DETAILED DESCRIPTION OF ILLUSTRATIVE ASPECTS

The present disclosure may be understood more readily by reference to the following detailed description of desired aspects and the examples included therein. In the following specification and the claims that follow, reference will be made to a number of terms which have the following meanings. Also, within the scope of the disclosure are articles of manufacture prepared according to any of the methods described herein. For example, articles that can be produced using the materials and methods of the disclosure include those in the electrical field, for example, computer, antenna and lighting articles.

Liquid crystalline polymers can provide a desirable combination of properties for a wide variety of applications. For example, films derived from liquid crystalline polymers can provide a barrier to oxygen and moisture, rendering them effective for use in packaging applications. Films formed from liquid crystalline polymers are also attractive for use in circuit board applications due to their stability and good dielectric properties, such as low dissipation factor at a broad frequency range. Despite exhibiting many desirable properties, the use of liquid crystalline polymers can be limited by a lack of adequate melt strength and poor processability. Liquid crystalline polymers can have narrow processing windows, and films formed from liquid crystalline polymers can have poor tear strength in the machine direction, as well as low yield during film making and assembly processes.

Recently, however, attempts have been made to use liquid crystalline polymers having a high heat resistance for the molded parts of a compact camera module (CCM). Compact camera modules ("CCM") are often employed in mobile phones, laptop computers, digital cameras, digital video cameras, that contain a plastic lens barrel disposed on a base. Because conventional plastic lenses could not withstand solder reflow, camera modules were not typically surface mounted. Recent use of LCP in components of the CCM, such as the lens barrel or the base on which it is mounted, may still be plagued by poor performance. To improve the mechanical properties of such polymers, it is known to add a plate-like substance (for example, mineral fillers like talc) and milled glass. Although strength and elastic modulus can be improved in this manner, problems are still encountered when attempting to use such materials in compact camera modules because of their small dimensional tolerance. For example, the mechanical properties are often poor or not uniform, which leads to poor filling and a lack of dimensional stability in the molded part. Further, an increase in the amount of milled glass to improve mechanical properties can result in a surface that is too rough, which can lead to errors in the camera performance and sometimes cause unwanted particle generation.

Aspects of the present disclosure may improve upon the application of LCP in CCM, particularly for ball guide actuator type of CCM. Generally, there are two methods for auto-focus and optical image stabilization (OIS): ball guide type and spring-and-wire (or spring) type. In the ball type, which is applicable here, ceramic balls are crucial component to achieve focus and image stabilization. An example of the ball guide and spring type housing-configurations and their respective characteristics are shown in FIG. 1, adapted from, "Camera Module," https://www.samsungsem.com/global/product/module/camera-module.do. Use of a ball guide housing may result in the ceramic balls causing dents on the inner surface of the CCM housing in conventional CCM housings including an LCP and mica filler. The balls may move in the X, Y, Z direction, thereby causing dents and damage to the CCM actuator surface ultimately causing malfunction of auto-focus and OIS.

In these CCM actuators, significant particle generation during vibration and drop may also result in poor quality. Conventional CCM actuators consisting of LCP and mica fillers have been shown to generate significant amounts particles upon impact by reliability tests such as vibration and free drop test. This particulate may be attributed to the mineral filler.

There have been attempts to achieve LCP compositions with varying capabilities. Published International Application WO 2022214927A2 describes the use of inorganic filler with liquid crystalline polymer, polyetherimide, and a compatibilizer to achieve liquid crystalline polymer compositions with a balance of properties. Japanese Patent describes a polymer alloy including liquid crystalline copolyester and polyetherimide. U.S. Pat. No. 5,366,663 discloses mixtures including liquid crystalline copolymers, polyetherimides, and compatibilizers to achieve compositions with improved tensile properties. Japanese Patent JP 04017394B2 discloses resin compositions including synthetic resin and plate-like inorganic filler such that the compositions have improved mechanical strength and heat resistance as well as low resin deterioration. Japanese Published Patent Application JP 2001152036A also discloses resin compositions including synthetic resin and synthetic mica to provide compositions with improved moldability and reduced resin deterioration. Japanese Published Patent Application JP 2007197714A discloses compositions including liquid crystalline resin, thermoplastic resin, and fine talc such that the compositions exhibit improved minimal molding shrinkage and elongation deflection.

Other research has focused on formulations for use in compact camera modules. Published International Application WO 2014143176A1 discloses a compact camera module formed from a composition including liquid crystalline polymer and a plurality of mineral fibers. United States Published Patent Application US20200304694A1 discloses an actuator for a camera module including a composition including an aromatic polymer and one or more mineral fillers. The disclosed composition exhibited flexural strength and hardness properties enabling the formulation to have minimized denting on impact.

Aspects of the present disclosure may resolve many of the above-described technical limitations described above. Compositions according to aspects of the disclosure exhibit improved properties as compared to conventional LCP materials that include a mica filler. As provided herein, improved properties include, but are not limited to, improved anti-dent performance and reduced particle generation. Compositions of the present disclosure may include from about 50 wt % to about 85 wt % of a liquid crystal polymer resin; from about 0.1 wt % to about 15 wt % of a polyetherimide polymer; from about 0.05 wt % to about 8 wt % of a compatibilizer; and from about 2 wt % to about 25 wt % of an inorganic mineral filler. The combined weight percent value of all components does not exceed 100 wt %, all weight percent values are based on the total weight of the composition.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Various combinations of elements of this disclosure are encompassed by this disclosure, for example, combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of aspects described in the specification.

LCP Compositions

The disclosed compositions may include a liquid crystal polymer resin, a polyetherimide polymer, a compatibilizer, and an inorganic mineral filler. In certain aspects, the composition includes a blend of LCP polymer resins.

Compositions according to aspects of the disclosure have improved properties as compared to mica filled LCP or mica filled LCP with polyetherimide. The specific combination of components achieves certain improved performance with respect to anti-dent performance and particulate release. More specifically, a 50 mm (millimeter)×60 mm sample having a thickness of 0.6 mm molded from the composition exhibits an anti-dent performance characterized by a dent depth from 30-40 micrometers (μm) as measured using a three-dimensional surface profiler, and the sample is tested using a drop tester with a 1.6 mm diameter steel ball having a weight of 50 grams dropped from a height of 50 mm. A CCM VCM housing formed from the disclosed composition may exhibit less particulate release than a second CCM VCM housing formed from a reference composition. The reference composition includes the same liquid crystal polymer resin and mica filler, but does not include the polyetherimide polymer, and the CCM VCM housing is 12 mm×12 mm×7 mm with 1×2 mm cavities.

The liquid crystal polymer resin may be derived from 4-hydroxybenzoic acid and 6-hydroxy-2-naphthoic acid. The polyetherimide may be derived from bisphenol A dianhydride and m-phenylene diamine, and aniline end-caps. The compatibilizer may include an ethylene-glycidyl methacrylate copolymer. In some aspects, the mineral filler may include mica.

Liquid Crystalline Polymer Resin

In various aspects, the disclosed composition may include a liquid crystalline polymer (LCP) resin. LCPs are believed to have a fixed molecular shape, for example, linear, due to the nature of the repeating units in the polymeric chain. The repeating units typically include rigid molecular elements. The rigid molecular elements (mesogens) are frequently rod-like or disk-like in shape and are typically aromatic and frequently heterocyclic. The rigid molecular elements can be present in one or both of the main chain (backbone) of the polymer and in the side chains. The rigid molecular elements can be separated by more flexible molecular elements, sometimes referred to as spacers.

Both lyotropic and thermotropic liquid crystalline polymers may be useful in the present disclosure. In an aspect, the liquid crystalline polymer can be a thermotropic liquid crystalline polymer, which may include liquid crystalline polyesters, liquid crystalline polycarbonates, liquid crystalline poly(ether ether ketones), liquid crystalline poly(ether ketone ketones), and liquid crystalline polyester imides. Thermotropic liquid crystalline polymers may also include polymers including a segment of a polymer capable of forming an anisotropic molten phase as part of one polymer chain thereof and a segment of a polymer incapable of forming an anisotropic molten phase as the rest of the polymer chain, and also a composite of a plurality of thermotropic liquid crystalline polymers.

Examples of monomers usable for the formation of the thermotropic liquid crystalline polymers may include: (a) an aromatic dicarboxylic acid compound, (b) an aromatic hydroxy carboxylic acid compound, (c) an aromatic diol compound, (d) a sulfur containing compound such as an aromatic dithiol (d1), an aromatic thiophenol (d2), and an aromatic thiol carboxylic acid compound (d3), and (c) an amine compound such as an aromatic hydroxyamine compound and an aromatic diamine compound. The monomers can be used alone or in a combination, for example, (a) and (c); (a) and (d); (a), (b) and (c); (a), (b) and (c); (a), (b), (c) and (c); and the like.

Examples of the aromatic dicarboxylic acid compound (a) include aromatic dicarboxylic acids, such as terephthalic acid, 4,4'-diphenyldicarboxylic acid, 4,4'-triphenyldicarboxylic acid, 2,6-naphthalenedicarboxylic acid, 1,4-naphthalenedicarboxylic acid, 2,7-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, and 1,6-naphthalenedicarboxylic acid; and alkyl-, alkoxy- and halogen-substituted derivatives of the above-mentioned aromatic dicarboxylic acids, such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

Examples of the aromatic hydroxy carboxylic acid compound (b) include aromatic hydroxy carboxylic acids, such as 4-hydroxybenzoic acid, 3-hydroxybenzoic acid, 6-hydroxy-2-naphthoic acid, and 6-hydroxy-1-naphthoic acid; and alkyl-, alkoxy- and halogen-substituted derivatives of the aromatic hydroxy carboxylic acids, such as 3-methyl-4-hydroxybenzoic acid, 3,5-dimethyl-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

Examples of the aromatic diol compound (c) include aromatic diols, such as 4,4'-dihydroxydiphenyl, 3,3'-dihydroxydiphenyl, 4,4'-dihydroxytriphenyl, hydroquinone, resorcinol, 2,6-naphthalenediol, 4,4'-dihydroxydiphenyl ether, bis(4-hydroxyphenoxy) ethane, 3,3'-dihydroxydiphenyl ether, 1,6-naphthalenediol, 2,2-bis(4-hydroxyphenyl) propane, and bis(4-hydroxyphenyl) methane; and alkyl-, alkoxy- and halogen-substituted derivatives of the aromatic diols, such as chlorohydroquinone, methylhydroquinone, t-butylhydroquinone, phenylhydroquinone, methoxyhydroquinone, phenoxyhydroquinone, 4-chlororesorcinol, and 4-methylresorcinol.

Examples of the aromatic dithiol (d1) include benzene-1,4-dithiol, benzene-1,3-dithiol, 2,6-naphthalene-dithiol, and 2,7-naphthalene-dithiol. Examples of the aromatic thiophenol (d2) include 4-mercaptophenol, 3-mercaptophenol, and 6-mercapto-phenol. Examples of the aromatic thiol carboxylic acid (d3) include 4-mercaptobenzoic acid, 3-mercaptobenzoic acid, 6-mercapto-2-naphthoic acid, and 7-mercapto-2-naphthoic acid.

Examples of the aromatic hydroxyamine compound and the aromatic diamine compound (c) include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, N-acetyl-para-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminodiphenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), and 4,4'-diaminodiphenyl ether (oxydianiline).

Thermotropic liquid crystalline polymers may be used either alone or in a mixture of at least two thereof. In an aspect the composition can include a thermotropic liquid crystalline polymer such as an aromatic polyester having a melting point of at least 290° C.

In some aspects, the liquid crystalline polymer may include a liquid crystalline polyester. The liquid crystalline polyester can be derived from an aromatic hydroxycarboxylic acid (such as p-hydroxybenzoic acid and 2-hydroxy-6-naphthoic acid), an aromatic dicarboxylic acid (such as terephthalic acid, isophthalic acid, and 2,6-naphthalenedicarboxylic acid), an aromatic dihydroxy compound (such as hydroquinone, resorcinol, 4,4'-dihydroxydiphenyl, and 2,6-dihydroxynaphthalene), or a combination including at least one of the foregoing. Aromatic liquid crystal polyesters may be obtained by polycondensation of 80 mole percent to 100 mole percent (mol %) of p-hydroxybenzoic acid (I), terephthalic acid (II), and 4,4'-dihydroxybiphenyl (III) (including derivatives thereof) (in which the total of (I) and (II) is 60 mol % or more) and 0 mol % to 20 mol % of other aromatic compounds capable of a polycondensation reaction with any of (I), (II), and (III), based on the total moles of (I), (II), (III), and any other aromatic compounds in the polycondensation reaction.

In further aspects, the liquid crystalline polymer may be derived from 4-hydroxybenzoic acid and 6-hydroxy-2-naphthoic acid. In an aspect, the liquid crystalline polymer is derived from 4-hydroxybenzoic acid, 6-hydroxy-2-naphthoic acid, naphthalene dicarboxylic acid, and hydroquinone.

Examples of specific commercial liquid crystalline polymers that can be used include, but are not limited to, VECTRA™ and ZENITE™, both commercially available from Celanese, XYDAR™, commercially available from Solvay Specialty Polymers, those available from RTP Co., for example, the RTP-3400 series liquid crystalline polymers, and those available from UENO Fine Chemicals Industry, Ltd., for example, LCP-A 5000 and LCP-A 6000.

The liquid crystalline polymer may be present in the composition in an amount of 50 weight percent to 85 weight percent (wt %), based on the total weight of the composition. Within this range, the liquid crystalline polymer can be present in an amount of at least 50 wt %, at least 55 wt %, at least 58 wt %, at least 60 wt %, at least 62 wt %, at least 64 wt %, at least 66 wt %, at least 68 wt %, at least 70 wt %, at least 72 wt %, at least 74 wt %, at most 85 wt %, at most 83 wt %, at most 80 wt %, at most 78 wt %, at most 76 wt %, at most 74 wt %, at most 72 wt %, at most 70 wt %, at most 68 wt %, at most 66 wt %, or at most 64 wt %, based on the total weight of the composition.

Polyetherimide Polymer

In an aspect, the polymer composition may include a polyimide polymer such as a polyetherimide. Polyimides include more than 1, for example 5 to 1000, or 5 to 500, or 10 to 100, structural units of formula (1)

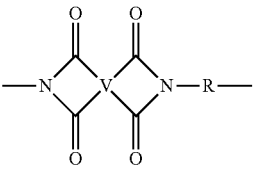

(1)

wherein each V is the same or different, and is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloaliphatic group, in particular a substituted or unsubstituted $C_{6-20}$ aromatic hydrocarbon group. Examples of aromatic hydrocarbon groups may include any of those of the formulas (1) below.

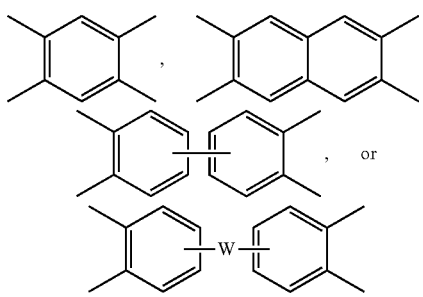

(1)

wherein W is —O—, —S—, —C(O)—, —SO$_2$—, —SO—, a $C_{1-18}$ hydrocarbon moiety that can be cyclic, acyclic, aromatic, or non-aromatic, —P(R$^a$)(=O)— wherein R$^a$ is a $C_{1-18}$ alkyl or $C_{6-12}$ aryl, —C$_y$H$_{2y}$— wherein y is an integer from 1 to 5 or a halogenated derivative thereof (which includes perfluoroalkylene groups), or a group of the formula —O—Z—O— as described in T of formula (3) below.

Each R in formula (1) may be the same or different, and may a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of formulas (2)

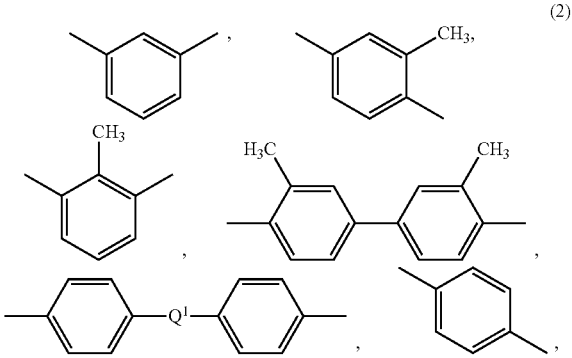

(2)

-continued

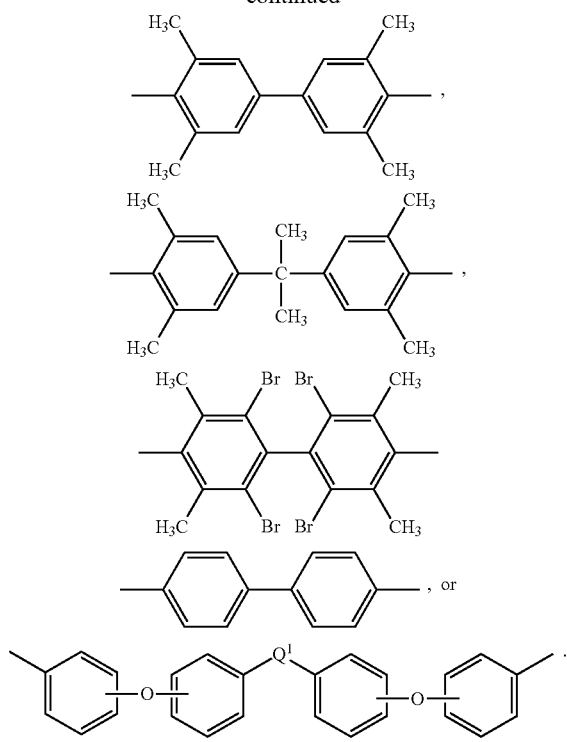

wherein $Q^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an aspect R is m-phenylene, p-phenylene, or a diaryl sulfone.

Polyetherimides may also be classified as a class of polyimides that include more than 1, for example 10 to 1000, or 10 to 500, structural units of formula (3)

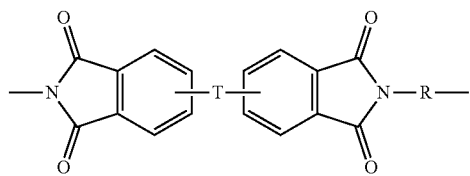 (3)

wherein each R is the same or different, and is as described in formula (1).

Further in formula (3), T may be —O— or a group of the formula —O—Z—O— wherein the divalent bonds of the —O— or the —O—Z—O— group are in the 3,3',3,4',4,3', or the 4,4' positions. The group Z in —O—Z—O— of formula (3) is a substituted or unsubstituted divalent organic group, and may be an aromatic C$_{6-24}$ monocyclic or polycyclic moiety optionally substituted with 1 to 6 C$_{1-8}$ alkyl groups, 1 to 8 halogen atoms, or a combination including at least one of the foregoing, provided that the valence of Z is not exceeded. Examples of Z may include groups derived from a dihydroxy compound of formula (4)

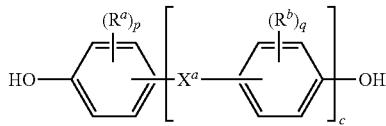 (4)

wherein R$^a$ and R$^b$ can be the same or different and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further include heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. In some aspects, the polyetherimide can be a copolymer, for example, a polyetherimide sulfone copolymer including structural units of formula (1) wherein at least 50 mole % of the R groups are of formula (2) wherein $Q^1$ is —SO$_2$— and the remaining R groups are independently p-phenylene or m-phenylene or a combination including at least one of the foregoing; and Z is 2,2'-(4-phenylene) isopropylidene.

Alternatively, the polyetherimide copolymer optionally includes additional structural imide units, for example imide units of formula (1) wherein R and V are as described in formula (1), for example V is wherein W is a single bond, —O—, —S—, —C(O)—, —SO$_2$—, —SO—, a C$_{1-18}$ hydrocarbon moiety that can be cyclic, acyclic, aromatic, or non-aromatic, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (which includes perfluoroalkylene groups). The polyimide and polyetherimide can be prepared by any of the methods well known to those skilled in the art, and as further described in International Application WO 2021009727.

In various aspects, the polyimide polymer may include copolymers, for example poly(siloxane-etherimide) copolymer including polyetherimide units of formula (1) and siloxane blocks of formula (6)

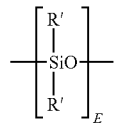 (6)

wherein E has an average value of 2 to 100, 2 to 31, 5 to 75, 5 to 60, 5 to 15, or 15 to 40, each R' is independently a C$_{1-13}$ monovalent hydrocarbyl group. For example, each R' can independently be a C$_{1-13}$ alkyl group, C$_{1-13}$ alkoxy group, C$_{2-13}$ alkenyl group, C2-13 alkenyloxy group, C$_{3-6}$ cycloalkyl group, C$_{3-6}$ cycloalkoxy group, C$_{6-14}$ aryl group, C$_{6-10}$ aryloxy group, C$_{7-13}$ arylalkyl group, C$_{7-13}$ arylalkoxy group, C$_{7-13}$ alkylaryl group, or C$_{7-13}$ alkylaryloxy group. Examples of specific poly(siloxane-etherimide)s are described in U.S. Pat. Nos. 4,404,350, 4,808,686 and 4,690,997. The relative amount of polysiloxane units and etherimide units in the poly(siloxane-etherimide) depends on the desired properties, and are selected using the guidelines provided herein. In particular, as mentioned above, the block or graft poly(siloxane-etherimide) copolymer is selected to have a certain average value of E, and is selected and used in amount effective to provide the desired wt % of polysiloxane units in the composition. In an aspect the poly (siloxane-etherimide) includes 10 to 50 wt %, 10 to 40 wt %, or 20 to 35 wt % polysiloxane units, based on the total weight of the poly(siloxane-etherimide). In an aspect, polyetherimide-siloxane can be excluded from the composition.

The disclosed polyetherimide polymer may have a have a melt index of 0.1 to 10 grams per minute (g/min), as measured by American Society for Testing Materials (ASTM) D1238 at 340 to 370° C., using a 6.7-kilogram (kg) weight. In an aspect, the polyetherimide has a weight average molecular weight (Mw) of 1,000 to 150,000 grams/mole (Dalton), as measured by gel permeation chromatography, using polystyrene standards. In an aspect the polyetherimide has an Mw of 10,000 to 80,000 Daltons. Such polyetherimides typically have an intrinsic viscosity greater than 0.2 deciliters per gram (dl/g), or, more specifically, 0.35 to 0.7 dl/g as measured in m-cresol at 25° C. Examples of some such polyetherimides may include, but are not limited to, Ultem™ 1000 (number average molecular weight (Mn) 21,000; weight average molecular weight (Mw) 54,000; dispersity 2.5), Ultem™ 1010 (Mn 19,000; Mw 47,000; dispersity 2.5), Ultem™ 1040 (Mn 12,000; Mw 34,000-35,000; dispersity 2.9), or mixtures thereof.

In some aspects, the polymer composition may include from about 0.1 wt % to about 15 wt % of the polyetherimide polymer. Within this range, the composition may include at least 0.15 wt %, at least 0.5 wt %, at least 0.8 wt %, at least 1 wt %, at least 2 wt %, at least 3 wt %, at least 4 wt %, at least 5 wt %, at least 6 wt %, at least 7 wt %, at least 7.5 wt %, at least 8 wt %, at least 9 wt %, at least 10 wt %, at most 15 wt %, at most 14 wt %, at most 13 wt %, at most 12 wt %, at most 11 wt %, at most 10 wt %, at most 9 wt %, at most 8 wt %, at most 7 wt %, at most 6 wt %, or at most 5 wt %, of the polyetherimide polymer, based on the total weight of the polymer composition.

Compatibilizer or Impact Modifier

In various aspects, the disclosed compositions may include a compatibilizer. As used herein, "compatibilizer" refers to an additive used to improve the miscibility of copolymers or to improve the miscibility between polymers or polymer phase and fillers. The compatibilizer may be configured to improve the blending compatibility of components of the polymer composition. For example, the compatibilizer may be improving the compatibility of the LCP and PEI. In an aspect, suitable polymeric compatibilizers can have a weight average molecular weight of, for example, greater than 1,000 grams per mole, or greater than 10,000 grams per mole, determined using gel permeation chromatography in a suitable solvent and relative to suitable standards, each of which can be determined without undue experimentation.

In certain aspects, the compatibilizer may include a polyepoxy compound, such as an epoxy functionalized block copolymer. The epoxy-functional block copolymers may further include additional units, for example $C_{1-4}$ alkyl (meth)acrylate units. In one aspect, the impact modifier is terpolymeric, including polyethylene blocks, methyl acrylate blocks, and glycidyl methacrylate blocks. Specific compatibilizers may be a co- or terpolymer including units of ethylene, glycidyl methacrylate (GMA), and methyl acrylate. For example, the compatibilizer may include repeating units derived from ethylene and glycidyl methacrylate; ethylene, a $C_{1-6}$ alkyl acrylate, and glycidyl acrylate; ethylene, methyl acrylate, and glycidyl acrylate; ethylene, butyl acrylate, and glycidyl acrylate; or ethylene, vinyl acetate, and glycidyl acrylate. In an aspect, the polyepoxy compound can be an ethylene-glycidyl methacrylate copolymer, an ethylene-glycidyl methacrylate-methyl acrylate terpolymer, or an ethylene-glycidyl methacrylate-vinyl acetate terpolymer. In an aspect, the polyepoxy compound can be an ethylene-glycidyl methacrylate copolymer, including 1 mol % to 5 mol % glycidyl methacrylate groups based on the total moles of the polyepoxy compound. Examples of polyepoxy compounds can include Igetabond™, commercially available from Sumitomo, Bondfast E™, commercially available from Sumitomo, and Lotader™, commercially available from Arkema.

Examples of impact modifiers include the ethylene-methyl acrylate-glycidyl methacrylate terpolymer including 8 wt % or about 8 wt % glycidyl methacrylate units available under the trade name LOTADER™ AX8900 from Arkema. Another epoxy-functional block copolymer that can be used in the composition includes ethylene acrylate, for example an ethylene-ethylacrylate copolymer having an ethylacrylate content of less than 20%, available from Rohm and Haas (Dow Chemical) under the trade name Paraloid™ EXL-3330. It will be recognized that combinations of compatibilizers may be used.

In one example, the epoxy-functional block copolymer may include units derived from a $C_{2-20}$ olefin and units derived from a glycidyl (meth)acrylate. Examples of olefins include ethylene, propylene, butylene, and the like. The olefin units can be present in the copolymer in the form of blocks, such as, polyethylene, polypropylene, polybutylene, and the like blocks. It is also possible to use mixtures of olefins, i.e., blocks containing a mixture of ethylene and propylene units, or blocks of polyethylene together with blocks of polypropylene.

In various aspects, the compatibilizer may include an epoxy functionalized block copolymer. For example, the compatibilizer may include functionalized polyolefin ethylene-acrylate terpolymers, such as ethylene-acrylic esters-maleic anhydride (MAH) or glycidyl methacrylate (GMA). The functionalized terpolymer may optionally contain repeat units in its backbone which are derived from an anhydride group containing monomer, such as maleic anhydride. In another scenario, the functionalized terpolymer contains anhydride moieties which are grafted onto the polymer in a post polymerization step.

In further aspects, the polyepoxy compound may include structural units having pendant epoxy groups. In an aspect, the polyepoxy compound includes three or more epoxy groups per molecule. In an aspect, the polyepoxy compound includes an addition polymer of an ethylenically unsaturated epoxy compound (also referred to as an epoxy functional elastomer) or an epoxidized Novolak resin. In some aspects, the polyepoxy compound can be an epoxy functional elastomer. Epoxy functional elastomers include copolymers derived from an alpha olefin and a glycidyl ester of an a,b-unsaturated carboxylic acid. Suitable alpha olefins can include ethylene, propylene, 1-butene, and the like. Ethylene can be preferred. The glycidyl esters of the a,b-unsaturated carboxylic acid can be of the formula (8)

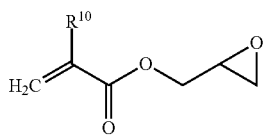

(8)

wherein $R^{10}$ can be hydrogen or a $C_{1-6}$ alkyl group, preferably methyl. Examples of glycidyl esters of the a,b-unsaturated carboxylic acid can include glycidyl acrylate, glycidyl methacrylate and glycidyl ethacrylate. The epoxy functional olefinic elastomer is preferably an olefinic copolymer containing 60 wt % to 99.5 wt % of an α-olefin and 0.5 wt % to 40 wt % of a glycidyl ester of an a,b-unsaturated carboxylic acid, preferably 3 wt % to 30 wt %, based on the weight of epoxy functional olefinic elastomer.

In an aspect, the polyepoxy compound can be a Novolak epoxy resin. Novolak epoxy resins can be obtained by reacting Novolak-type phenolic resins with epichlorohydrin.

In an aspect, the compatibilizer includes a poly(ester-carbonate). Such polycarbonates include recurring carbonate units of formula (9) and repeating ester units of formula (10)

$$-R^1-O-\overset{O}{\underset{\parallel}{C}}-O- \quad (9)$$

$$-\overset{O}{\underset{\parallel}{C}}-T-\overset{O}{\underset{\parallel}{C}}-O-J-O- \quad (10)$$

wherein at least 60% of the total number of $R^1$ groups are aromatic, or each $R^1$ contains at least one Ce-30 aromatic group. Preferably, each $R^1$ can be derived from a dihydroxy compound such as an aromatic dihydroxy compound or a bisphenol. Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis (4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol).

J in formula (10) may be a divalent group derived from an aromatic dihydroxy compound (including a reactive derivative thereof), such as a bisphenol, e.g., bisphenol A; and T is a divalent group derived from an aromatic dicarboxylic acid (including a reactive derivative thereof), preferably isophthalic or terephthalic acid wherein the weight ratio of isophthalic acid to terephthalic acid is 91:9 to 2:98. Copolyesters containing a combination of different T or J groups can be used. The polyester units can be branched or linear.

Aromatic dicarboxylic acids that can be used to prepare the polyester units include isophthalic or terephthalic acid, 1,2-di(p-carboxyphenyl) ethane, 4,4'-dicarboxydiphenyl ether, 4,4'-bisbenzoic acid, or a combination thereof. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, or a combination thereof. A specific dicarboxylic acid includes a combination of isophthalic acid and terephthalic acid wherein the weight ratio of isophthalic acid to terephthalic acid is 91:9 to 2:98. A portion of the groups T, for example up to 20 mol %, can be aliphatic, for example derived from 1,4-cyclohexane dicarboxylic acid. Preferably all T groups are aromatic. The molar ratio of ester units to carbonate units in the polycarbonates can vary broadly, for example 1:99 to 99:1, or 10:90 to 90:10, or 25:75 to 75:25, or 2:98 to 15:85, depending on the desired properties of the final composition.

Specific poly(ester-carbonate)s are those including bisphenol A carbonate units and isophthalate/terephthalate-bisphenol A ester units, i.e., a poly(bisphenol A carbonate)-co-(bisphenol A-phthalate-ester) of formula (11)

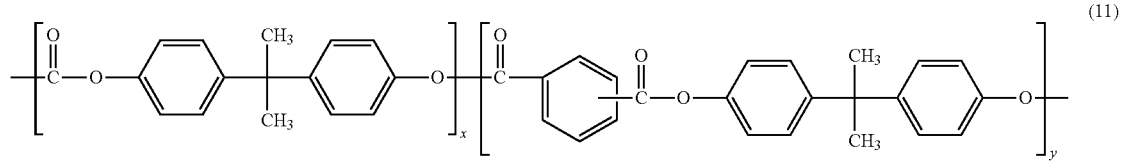

(11)

wherein x and y represent the weight percent of bisphenol A carbonate units and isophthalate/terephthalate-bisphenol A ester units, respectively. Generally, the units are present as blocks. In an aspect, the weight ratio of carbonate units x to ester units y in the polycarbonates is 1:99 to 50:50, or 5:95 to 25:75, or 10:90 to 45:55. Copolymers of formula (11) including 35 wt % to 45 wt % of carbonate units and 55 wt % to 65 wt % of ester units, wherein the ester units have a molar ratio of isophthalate to terephthalate of 45:55 to 55:45 are often referred to as poly(carbonate-ester)s (PCE). Copolymers including 15 wt % to 25 wt % of carbonate units and 75 wt % to 85 wt % of ester units wherein the ester units have a molar ratio of isophthalate to terephthalate from 98:2 to 88:12 are often referred to as poly(phthalate-carbonate)s (PPC).

In another aspect, the poly(ester-carbonate) is a poly (carbonate-co-monoarylate ester) of formula (12) that includes aromatic carbonate units and repeating monoarylate ester units

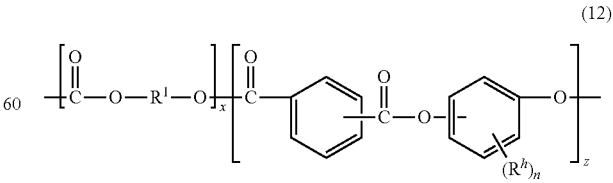

(12)

wherein $R^1$ is as defined in formula (8). Each $R^h$ may be independently a $C_{1-4}$ alkyl, and n is 0 to 3, 0 to 1, or 0. The mole ratio of carbonate units x to ester units z can be from 99:1 to 1:99, or from 98:2 to 2:98, or from 90:10 to 10:90. In an aspect the mole ratio of x:z is from 50:50 to 99:1, or from 1:99 to 50:50.

A suitable polyester-carbonate may include bisphenol A carbonate units, and ITR ester units derived from terephthalic acid, isophthalic acid, and resorcinol, i.e., a poly(bisphenol A carbonate-co-isophthalate/terephthalate-resorcinol ester) of formula (13)

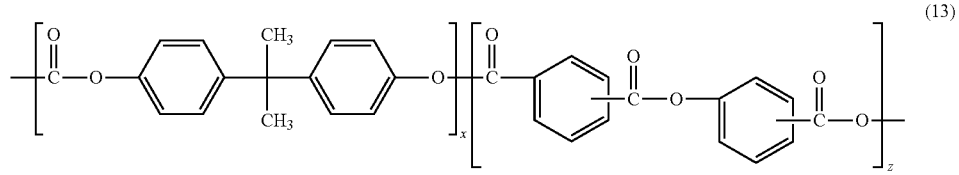

wherein the mole ratio of x:z is from 98:2 to 2:98, or from 90:10 to 10:90. In an aspect the mole ratio of x:z is from 50:50 to 99:1, or from 1:99 to 50:50. The ITR ester units can be present in the poly(bisphenol A carbonate-co-isophthalate-terephthalate-resorcinol ester) in an amount greater than or equal to 95 mol %, preferably greater than or equal to 99 mol %, and still more preferably greater than or equal to 99.5 mol %, based on the total moles of ester units in the copolymer.

Other carbonate units, other ester units, or a combination thereof may be present, in a total amount of 1 mol % to 20 mol %, based on the total moles of units in the copolymers, for example monoaryl carbonate units of formula (14) and bisphenol ester units of formula (15):

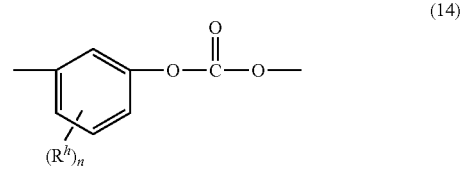

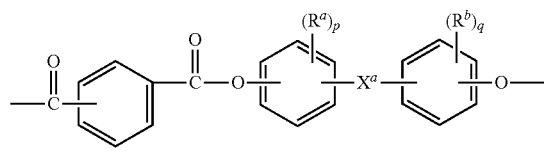

wherein, in the foregoing formulae, $R^h$ is each independently a CHO hydrocarbon group, n is 0-4, $R^a$ and $R^b$ are each independently a $C_{1-12}$ alkyl, p and q are each independently integers of 0-4, and $X^a$ is a single bond, —O—, —S—, —S(O)—, —S(O)_2—, —C(O)—, or a $C_{1-13}$ alkylidene of formula —C($R^c$)($R^d$)— wherein Re and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula (16)

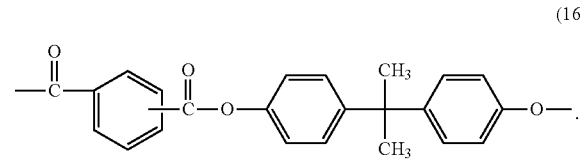

In an aspect, the poly(bisphenol A carbonate-co-isophthalate/terephthalate-resorcinol ester) includes 1 mol % to 90 mol % of bisphenol A carbonate units, 10 mol % to 99 mol % of isophthalic acid-terephthalic acid-resorcinol ester units, and optionally 1 mol % to 60 mol % of resorcinol carbonate units, isophthalic acid-terephthalic acid-bisphenol A phthalate ester units, or a combination thereof. In another aspect, a poly(bisphenol A carbonate-co-isophthalate/terephthalate resorcinol ester) includes 10 mol % to 20 mol % of bisphenol A carbonate units, 20 mol % to 98 mol % of isophthalic acid-terephthalic acid-resorcinol ester units, and optionally 1 mol % to 60 mol % of resorcinol carbonate units, isophthalic acid-terephthalic acid-bisphenol A phthalate ester units, or a combination thereof.

The poly(ester-carbonate)s can have a weight average molecular weight (Mw) of 2,000 g/mol to 100,000 g/mol, preferably 3,000 g/mol to 75,000 g/mol, more preferably 4,000 g/mol to 50,000 g/mol, more preferably 5,000 g/mol to 35,000 g/mol, and still more preferably 17,000 g/mol to 30,000 g/mol. Molecular weight determinations are performed using GPC using a cross linked styrene-divinyl benzene column, at a sample concentration of 1 milligram per milliliter, and as calibrated with bisphenol A homopolycarbonate standards. Samples are eluted at a flow rate of 1.0 ml/min with methylene chloride as the eluent.

The compatibilizer may be present in the composition in an amount of from 0.05 wt % to 8 wt %. Within this range, the composition may include at least 0.05 wt %, at least 0.5 wt %, at least 0.8 wt %, at least 1.0 wt %, at least 1.2 wt %, at least 1.4 wt %, at least 1.6 wt %, at least 1.8 wt %, at least 2.0 wt %, at least 2.2 wt %, at least 2.4 wt %, at most 8 wt %, at most 7.5 wt %, at most 7.0 wt %, at most 6.5 wt %, at most 6.0 wt %, at most 5.5 wt %, at most 5.0 wt %, at most 4.5 wt %, at most 4.0 wt %, at most 3.5 wt %, or at most 3.0 wt %, of the compatibilizer.

Filler

The compositions of the present disclosure may include a filler. In various aspects, the filler is an inorganic or mineral filler. Examples of inorganic or mineral fillers may include, but are not limited to, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or armospheres, kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations including at least one of the foregoing fillers or reinforcing agents.

In some aspects, the polymer composition may include an inorganic/mineral filler such as titanium dioxide, a titanate, or a combination thereof. In particular aspects the composition includes mica.

In certain examples, the composition includes from 2 wt % to 30 wt % of the mineral filler. Within this range, the composition may include at least 2 wt %, at least 3 wt %, at least 4 wt %, at least 5 wt %, at least 6 wt %, at least 7 wt %, at least 8 wt %, at least 9 wt %, at least 10 wt %, at least 11 wt %, at least 12 wt %, at least 13 wt %, at least 14 wt %, at least 15 wt %, at least 16 wt %, at least 17 wt %, at least 18 wt %, at least 19 wt %, at least 20 wt %, at most 30 wt %, at most 29 wt %, at most 28 wt %, at most 27 wt %, at most 26 wt %, at most 25 wt %, at most 24 wt %, at most 23 wt %, at most 22 wt %, at most 21 wt %, at most 20 wt %, at most 19 wt %, at most 18 wt %, at most 17 wt %, at most 16 wt %, at most 15 wt %, at most 14 wt %, at most 13 wt %, at most 12 wt %, or at most 11 wt %, of the mineral filler.

Additives

The composition can include various additives ordinarily incorporated into polymer compositions of this type, with the proviso that the additive(s) are selected so as to not significantly adversely affect the desired properties of the thermoplastic composition (good compatibility for example). Such additives can be mixed at a suitable time during the mixing of the components for forming the composition. The total amount of all of the further additives in the polymer composition may be, for example, from about 0.001 wt % to about 12 wt % based on the total weight of the composition sufficient to balance the amount of LCP, filler, compatibilizer, and such that the total weight of the composition remains 100 wt %. Suitable additives can include ultraviolet agents, ultraviolet stabilizers, heat stabilizers, antistatic agents, anti-microbial agents, anti-drip agents, radiation stabilizers, pigments, dyes, fibers, fillers, plasticizers, fibers, flame retardants, antioxidants, lubricants, wood, glass, and metals, and combinations thereof.

The composite disclosed herein can include one or more additional fillers. The filler can be selected to impart additional impact strength and/or provide additional characteristics that can be based on the final selected characteristics of the polymer composition. In certain aspects, the composite may include a glass fiber filler. In yet further aspects, the composite may be free or substantially free of a glass filler.

In specific aspects, the polymer composition may include a pigment or a colorant. The polymer composition may include colorants, pigments, or dyes as the color to be dispersed.

Suitable pigments include for example, inorganic pigments such as metal oxides and mixed metal oxides; sulfides such as zinc sulfides, or the like; aluminates; sodium sulfosilicates; sulfates and chromates; zinc ferrites; ultramarine blue; Pigment Brown 24; Pigment Red 101; Pigment Yellow 119; organic pigments; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Suitable dyes may include, for example, organic dyes, hydrocarbon and substituted hydrocarbon dyes; phthalocyanine dyes and pigments; oxazine dyes; carbostyryl dyes; porphyrin dyes; acridine dyes; anthraquinone dyes; arylmethane dyes; azo dyes; diazonium dyes. Suitable colorants may include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), apthalenetetracarboxylic derivatives, monoazo and disazo pigments, triarylmethanes, aminoketones, bis(styryl) biphenyl derivatives, and the like, as well as combinations including at least one of the foregoing colorants. In some examples, the polymer composition may include a carbon black.

Heat stabilizer additives include organophosphites (e.g. triphenyl phosphite, tris-(2,6-dimethylphenyl) phosphite, tris-(mixed mono- and di-nonylphenyl)phosphite or the like), phosphonates (e.g., dimethylbenzene phosphonate or the like), phosphates (e.g., trimethyl phosphate, or the like), or combinations including at least one of the foregoing heat stabilizers. The heat stabilizer can be tris(2,4-di-t-butylphenyl) phosphate available as IRGAPHOS™ 168.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), waxes (e.g., beeswax, montan wax, paraffin wax, or the like), or combinations including at least one of the foregoing plasticizers, lubricants, and mold release agents.

Light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis (4H-3,1-benzoxazin-4-one, commercially available under the trade name CYASORB™ UV-3638 from Cytec Industries Inc., Woodland, NJ), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB™ 5411 from Cytec Industries Inc., Woodland, NJ) or combinations including at least one of the foregoing light stabilizers.

Antioxidant additives include organophosphites such as tris(nonyl phenyl) phosphite, tris(2,4-di-t-butylphenyl) phosphite, bis(2,4-di-t-butylphenyl) pentaerythritol diphosphite, distearyl pentaerythritol diphosphite; alkylated monophenols or polyphenols; alkylated reaction products of polyphenols with dienes, such as tetrakis [methylene (3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl) propionate, pentaerythrityl-tetrakis [3-(3,5-di-tert-butyl-4-hydroxyphenyl) propionate; amides of beta-(3,5-di-tert-butyl-4-hydroxyphenyl)-propionic acid, or combinations including at least one of the foregoing antioxidants.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. A TSAN includes 50 wt % PTFE and 50 wt % SAN, based on the total weight of the encapsulated fluoropolymer. The SAN can include, for example, 75 wt % styrene and 25 wt % acrylonitrile based on the total weight of the copolymer.

In some aspects the composition includes from about 0.001 wt % to about 12 wt % of the additive. Within this range, the composition may include at least 0.001 wt %, at least 0.01 wt %, at least 0.1 wt %, at least 0.2 wt %, at least 0.3 wt %, at least 0.4 wt %, at least 0.5 wt %, at least 0.6 wt %, at least 0.7 wt %, at least 0.8 wt %, at least 0.9 wt %, at least 1.0 wt %, at least 1.5 wt %, at least 2.0 wt %, at least 2.5 wt %, at least 3 wt %, at least 4 wt %, at least 5 wt %, at most 12 wt %, at most 11 wt %, at most 10 wt %, at most 9 wt %, at most 8 wt %, at most 7 wt %, at most 6 wt %, at most 5 wt %, at most 4 wt %, or at most 3 wt %, of the additive.

Methods of Manufacture

The compositions may be formed by techniques known to those skilled in the art. Extrusion and mixing techniques, for example, may be utilized to combine the components of the resin composition.

The resin compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some aspects, the melt processed composition exits processing equipment such as an extruder through small exit holes in a die. The resulting strands of molten resin are cooled by passing the strands through a water bath. The cooled strands can be chopped into small pellets for packaging and further handling.

Aspects of the disclosure further relate to methods for making a thermoplastic composition. The one or any foregoing components described herein may be first dry blended with each other, or dry blended with any combination of foregoing components, then fed into an extruder from one or multi-feeders, or separately fed into an extruder from one or multi-feeders. According to various aspects, the disclosed compositions may be prepared by compounding on a twin-screw extruder. Materials may be blended together and fed by the main feeder. Extruded strands of the composition may be processed into pellets and dried for further molding and evaluation. The testing was conducted on pellets and molded parts.

In one aspect, the present disclosure pertains to plastic components, for example, that have been shaped, formed, or molded at least in part from the compositions described herein. Also provided are plastic components including a resin composition that is formed according to the presently disclosed methods for forming a resin composition.

The components may also be mixed together and then melt-blended to form the polymer compositions. The melt blending of the components involves the use of shear force, extensional force, compressive force, ultrasonic energy, electromagnetic energy, thermal energy or combinations including at least one of the foregoing forces or forms of energy. The barrel temperature on the extruder during compounding can be set at the temperature where at least a portion of the polymer has reached a temperature greater than or equal to about the melting temperature, if the resin is a semi-crystalline organic polymer, or the flow point (for example, the glass transition temperature) if the resin is an amorphous resin. The mixture including the foregoing mentioned components may be subject to multiple blending and forming steps if desirable. Methods may further include processing the composition to provide a molded part of desired thickness and/or dimension, such as components of a compact camera module.

Properties and Articles

The disclosed compositions including liquid crystal polymer, a polyetherimide polymer, a compatibilizer, and an inorganic mineral filler. The polymer compositions may exhibit improved anti-dent performance and particle scattering, while maintaining desirable mechanical properties, particularly those associated with compact camera modules and/or the housing thereof.

Compositions of the present disclosure exhibit improved anti-dent performance characterized by having a dent depth less than that of a pristine liquid crystal polymer resin or less than that of a liquid crystal polymer resin composition and polyetherimide polymer in the absence of the compatibilizer and/or inorganic mineral filler. As an example, a 50 mm×60 mm sample having a thickness of 0.6 mm molded from the composition exhibits an anti-dent performance characterized by a dent depth from 30-40 micrometers as measured using a three dimensional surface profiler, wherein the sample is tested using a drop tester with a 1.6 mm diameter steel ball having a weight of 50 grams dropped from a height of 50 mm.

A CCM VCM housing formed from the disclosed composition may exhibit less particulate release than a comparative CCM VCM housing formed from a reference composition, wherein the reference composition includes the same liquid crystal polymer resin and mica filler, but does not include the polyetherimide polymer.

Compositions of the present disclosure may also exhibit less particulate release or less particle generation upon impact. As an example, a molded sample including the composition may exhibit less particle generation upon impact and greater weldline strength when compared to a reference composition including neat or pure LCP or a combination of neat or pure LCP with the same mineral filler. The advantageous characteristics of the compositions disclosed herein make them appropriate for an array of uses. These compositions are thus suitable candidates for consumer electronics applications such as a compact camera module with less particle generation upon impact and improved anti-dent performance. In various aspects, the present disclosure provides compositions for use in a compact camera module. Articles of the present disclosure may include a compact camera module formed from the disclosed composition according to any means known in the art.

Various combinations of elements of this disclosure are encompassed by this disclosure, for example, combinations of elements from dependent claims that depend upon the same independent claim.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims, which follow, reference will be made to a number of terms which shall be defined herein. As used in the specification and the appended claims, the singular forms "a," "an" and "the" include plural referents unless the context clearly dictates otherwise. Thus, for example, reference to "a thermoplastic polymer component" includes mixtures of two or more thermoplastic polymer components. As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional processes" means that the additional processes can or cannot be included and that the description includes methods that both include and that do not include the additional processes.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding aspects to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound. A weight percent of a component, unless specifically stated to the contrary, is based on the total weight of the formulation or composition in which the component is included.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation is 100.

Unless otherwise stated to the contrary herein, all test standards are the most recent standard in effect at the time of filing this application.

As used herein, the terms "number average molecular weight" or "Mn" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, for example, polycarbonate polymers, by methods well known to a person having ordinary skill in the art using molecular weight standards, e.g., polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, for example, polycarbonate polymers, by methods well known to a person having ordinary skill in the art using molecular weight standards, for example, polycarbonate standards or polystyrene standards, preferably certified or traceable molecular weight standards.

In one aspect, "substantially free of" can be less than about 0.5 weight percent (wt %). In another aspect, substantially free of can be less than about 0.1 wt %. In another aspect, substantially free of can be less than about 0.01 wt %. In yet another aspect, substantially free of can be less than about 100 ppm. In yet another aspect, substantially free can refer to an amount, if present at all, below a detectable level. In one aspect, the compositions of the present disclosure are free of or substantially free of carbon filler or carbon-based filler. In certain aspects, to maintain colorability of the disclosed compositions, the compositions may be free of or substantially free of carbon black, carbon fiber, and/or graphite.

Each of the materials disclosed herein are either commercially available and/or the methods for the production thereof are known to those of skill in the art. It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

ASPECTS OF THE DISCLOSURE

In various aspects, the present disclosure pertains to and includes at least the following aspects.

Aspect 1. A composition comprising:
from about 50 wt % to about 85 wt % of a liquid crystal polymer resin;
from about 0.1 wt % to about 15 wt % of a polyetherimide polymer;
from about 0.05 wt % to about 8 wt % of a compatibilizer; and
from about 2 wt % to about 25 wt % of a mineral filler,
wherein the combined weight percent value of all components does not exceed 100 wt %, all weight percent values are based on the total weight of the composition, and
wherein a 50 mm (millimeter)×60 mm sample having a thickness of 0.6 mm molded from the composition exhibits an anti-dent performance characterized by a dent depth from 30-40 µm (micrometers) as measured using a three dimensional surface profiler, wherein the sample is tested using a drop tester with a 1.6 mm diameter steel ball having a weight of 50 grams dropped from a height of 50 mm.

Aspect 2. The composition according to Aspect 1, wherein the liquid crystal polymer resin comprises a polyether resin.

Aspect 3. The composition according to Aspect 1, wherein the liquid crystal polymer resin comprises a liquid crystalline polyether resin derived from 4-hydroxybenzoic acid and 6-hydroxy-2-naphthoic acid.

Aspect 4. The composition according to any one of Aspects 1-3, wherein the mineral filler comprises talc, clay, mica, wollastonite, titanium dioxide, or a combination thereof.

Aspect 5. The composition according to any one of Aspects 1-3, wherein the mineral filler is mica.

Aspect 6. The composition according to any one of Aspects 1-4, wherein the polyetherimide has a weight average molecular weight of 47,000 g/mol and a number average molecular weight of 19,000 g/mol.

Aspect 7. The composition according to any one of the Aspects 1-6, wherein the polyetherimide is present in an amount from about 7.5 wt % to about 10 wt %.

Aspect 8. The composition according to any one of Aspects 1-7, wherein the compatibilizer comprises an epoxy-functionalized block copolymer.

Aspect 9. The composition according to any one of Aspects 1-7, wherein the compatibilizer comprises an ethylene glycidyl methacrylate (EGMA) copolymer.

Aspect 10. The composition according to any one of Aspects 1-7, wherein the compatibilizer comprises repeating units derived from (a) ethylene and glycidyl methacrylate; (b) ethylene, a $C_{1-6}$ alkyl acrylate, and glycidyl acrylate; (c) ethylene, methyl acrylate, and glycidyl acrylate; (d) ethylene, butyl acrylate, and glycidyl acrylate; or (e) ethylene, vinyl acetate, or glycidyl acrylate.

Aspect 11. The composition according to any one of Aspects 1-7, wherein the compatibilizer comprises an ethylene-glycidyl methacrylate copolymer, an ethylene-glycidyl methacrylate-methyl acrylate terpolymer, an ethylene-glycidyl methacrylate-vinyl acetate terpolymer, or an ethylene-glycidyl methacrylate copolymer.

Aspect 12. The composition according to any one of Aspects 1-11, further comprising an additive material selected from the group consisting of: a metal deactivator; an acid scavenger; an antioxidant; a colorant; a dye; a flow promoter; a flow modifier; an impact modifier; a lubricant; a mold release agent; a pigment; a quenching agent; a thermal stabilizer; an ultraviolet (UV) absorbant; a UV reflectant; a UV stabilizer; a flame retardant; and combinations thereof.

Aspect 13. The composition according to Aspect 12, wherein the additive material comprises a pigment.

Aspect 14. The composition of Aspect 13, wherein the pigment comprises a carbon black.

Aspect 15. An article formed from the composition of any one of Aspects 1-14.

Aspect 16. The article according to Aspect 15, wherein the article is a component of a mobile compact camera module.

Aspect 17. A method of forming a composition, the method comprising:
(a) combining, to form a mixture
  i. from about 50 wt % to about 85 wt % of a liquid crystal polymer resin,
  ii. from about 0.1 wt % to about 15 wt % of a polyetherimide polymer,
  iii. from about 0.05 wt % to about 8 wt % of a compatibilizer, and
  iv. from about 2 wt % to about 25 wt % of a mineral filler; and
(b) extruding the mixture to form the composition,
wherein the combined weight percent value of all components does not exceed 100 wt %, and all weight percent values are based on the total weight of the composition, and
wherein a 50 mm×60 mm sample having a thickness of 0.6 mm molded from the composition exhibits an anti-dent performance characterized by a dent depth from 30-40 micrometers as measured using a three dimensional surface profiler, wherein the sample is tested using a drop tester with a 1.6 mm diameter steel ball having a weight of 50 grams dropped from a height of 50 mm.

Aspect 18. The method according to Aspect 17, wherein the composition formed according to the method has one or more of the components, features or properties according to any of Aspects 2 to 14.

EXAMPLES

The following examples are put forth so as to provide those of ordinary skill in the art with a complete disclosure and description of how the compounds, compositions, articles, devices and/or methods claimed herein are made and evaluated and are intended to be purely exemplary and are not intended to limit the disclosure. Efforts have been made to ensure accuracy with respect to numbers (for example, amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %. There are numerous variations and combinations of mixing conditions, for example, component concentrations, extruder design, feed rates, screw speeds, temperatures, pressures and other mixing ranges and conditions that can be used to optimize the product purity and yield obtained from the described process. Only reasonable and routine experimentation will be required to optimize such process conditions.

Various compositions were prepared by compounding on a 37 mm twin screw extruder from the raw materials shown in Table 1 (FIG. 2). Formulations were prepared by compounding on a 25 mm Werner Pfleiderer ZSK co-rotating twin-screw extruder with a vacuum vented standard mixing screw operated at a screw speed of 300 rpm. The temperature profile is given in Table 2. The strand was cooled through a water bath prior to pelletizing. An Engel 45, 75, 90 molding machine was used to mold the test parts for standard physical property testing. The pellets were dried for 3-4 hours at 90-110° C. in a forced air-circulating oven prior to injection molding. Table 2 (FIG. 3) lists the temperature profiles of the molding conditions. Injection molding conditions are shown in Table 3 (FIG. 4). An Engel 45, 75, 90 molding machine was used to mold the test parts for standard physical property testing. The pellets were dried for 3-4 hours at 90-110° C. in a forced air-circulating oven prior to injection molding. Table 4 (FIG. 5) presents the formulations prepared including LCP, polyetherimide, mineral filler, pigment, and compatibilizer. Formulations were evaluated for particulate release and anti-dent performance.

Figure 6B:
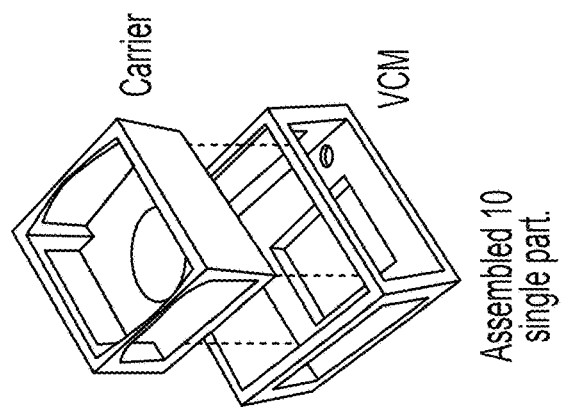
Figure 6A:
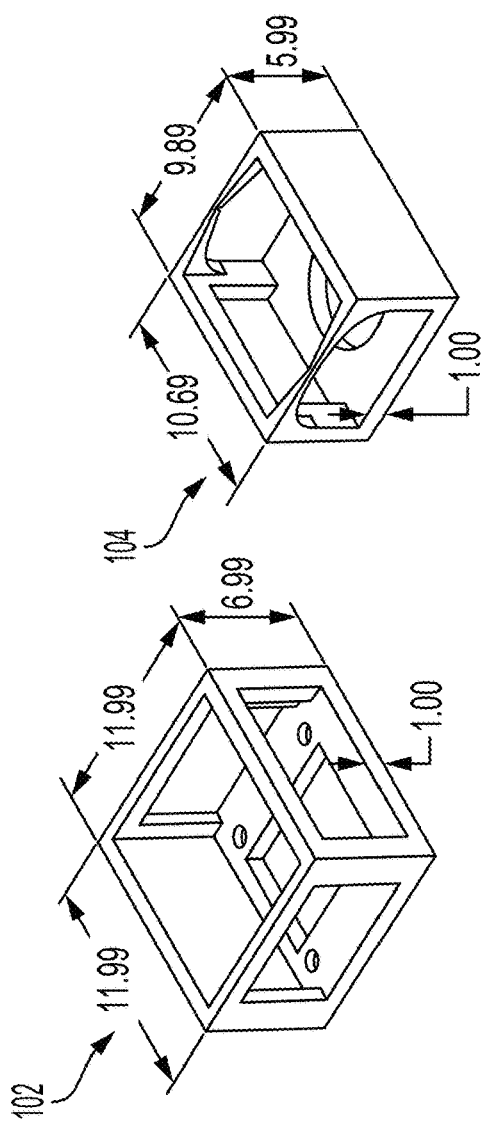

Particulate release. Molded samples formed from the compositions were evaluated to determine the amount of particulate or particles released upon impact. In order to measure particles released from external impact, samples were molded into a shape or tooling having a design comparable to or similar to the design of a commercially available CCM actuator or housing. Generally a camera module consists of a lens, a holder, a voice coil motor (VCM), an infrared ray filter, a sensor and a flexible printed circuit (FPC). An angled view of the design with respective dimensions is shown in FIG. 6A which depicts a VCM housing and a VCM carrier. VCM housing 102 and lens carrier 104 are shown. FIG. 6B shows the assembled part, including VCM housing 100 and lens carrier 102, that was tested for particle release. Table 5 (FIG. 7) shows further features of the housings prepared from each formulation. The VCM housing 102 measures approximately 12×12×7 mm and the VCM lens carrier 104 measures approximately 10.7×9.9×6 mm.

Figure 9:
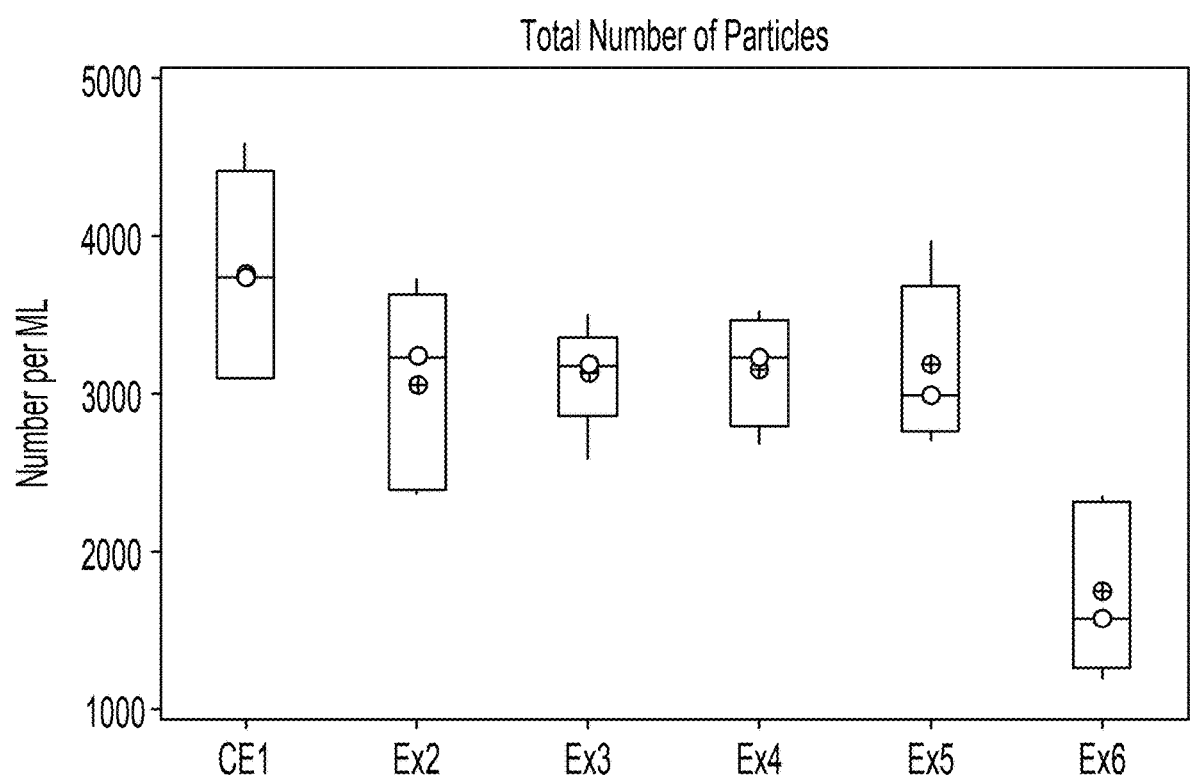
FIG. 9 is a graphical representation of the particle release measurements.

A liquid particle counter was used for counting actual particle/particulate release according to an internal method. Particle release upon impact was tested using a Multisizer 3 Coulter Counter having an aperture size of 280 µm (testing range 5.6 to 168 µm) and the volume of electrolytes was 200 milliliters with a 25 ml volume of pure water. Table 6 (FIG. 8) presents the particle release results. A comparative sample CE1 formed from LCP resin and mica filler (at 25 wt %) was also observed. FIG. 9 is a graphical representation of these results.

As shown in Table 6, the total number of particles for formulations featuring the LCP and PEI exhibited less particle generation compared to pure LCP with the amount of mica filler. See CE1 compared to Ex2. Ex2 through E6 showed less particle generation compared to CE1, which indicated that replacing part of LCP with PEI could help to reduce particle generation. Ex6 exhibited 54% better performance, which suggested reducing mineral filler loading would negatively affect particle release (increase) but balancing with PEI composition could contribute to improving the particle release by reducing the amount of mica filler loading.

Figure 10B:
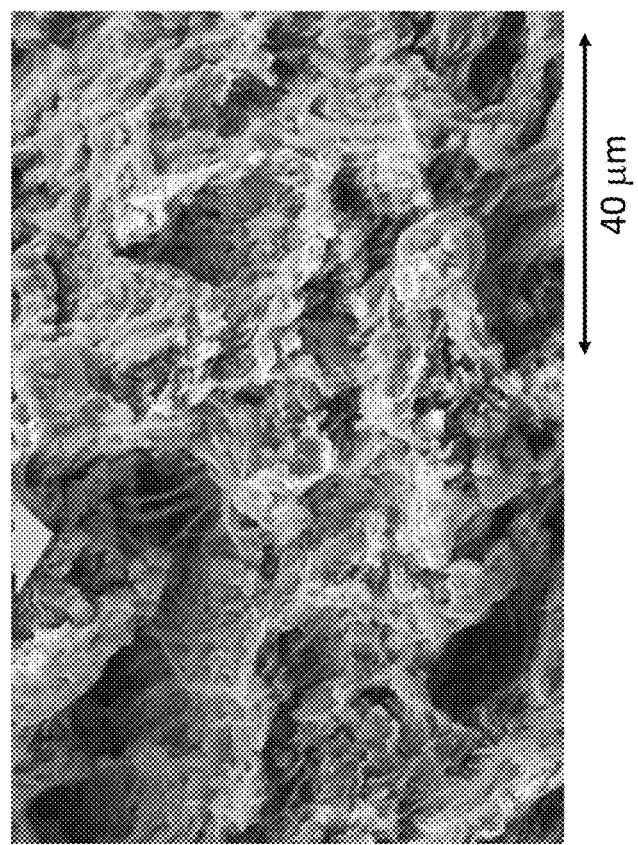
FIGS. 10A and 10B are scanning electron microscopy (SEM) images showing the LCP resin and LCP/epoxy samples, respectively.
Figure 10A:
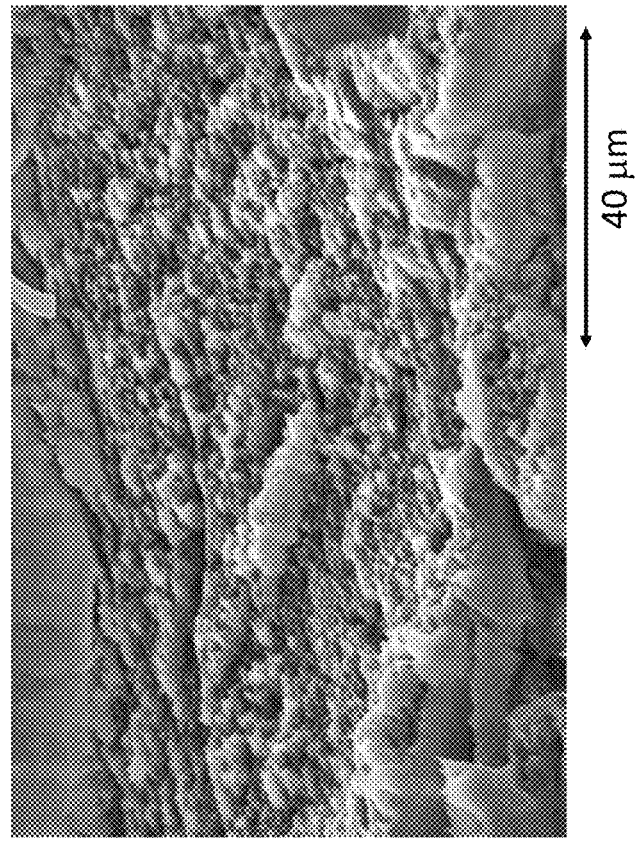

Without wishing to be bound by any particular theory, it was believed that layer orientation within the LCP affected particle release. Particles generated as a result of bonding force between LCP layers and filler. Formulations including a suitable functional elastomer were believed to alter the orientation of LCP to be more isotropic, or more specifically, less oriented. Scanning electron microscopy (SEM) images revealed the change in morphology with the presence of a functional elastomer. FIGS. 10A and 10B show an LCP resin molded bar and the LCP/epoxy-elastomer molded bar, respectively. As shown in FIGS. 10A and 10B, it can be seen that the morphology of the LCP is more isotropic. The orientation of the resin is disturbed by the addition of the elastomer in FIG. 10B. It is believed that the disclosed LCP resin blend exhibits improved bonding force between LCP layers or domains as well as LCP-filler interface, and thus resulted in less particle generation.

Anti-dent performance. Dent depth was measured for each formulation. A Dupont drop tester was used to drop a 1.6 mm, 50-gram steel ball from a 50 mm height onto 50 mm×60 mm×0.6 mm thick molded samples. The depth of the indentation measured using a three dimensional (3D) profiler, and the values are shown in Table 7 (FIG. 11). FIG. 12 is a graphical representation of these results. As shown, Ex5 and Ex6 showed a 64% and 48% improvement in depth performance, respectively. These values indicated that reducing the loading of mica filler attributed to optimal anti-dent performance.

Figure 13B:
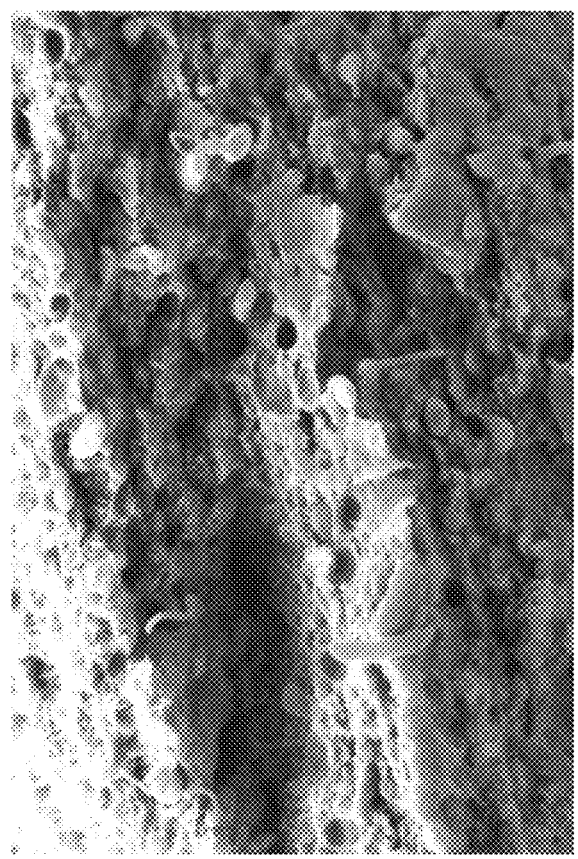
Figure 13A:
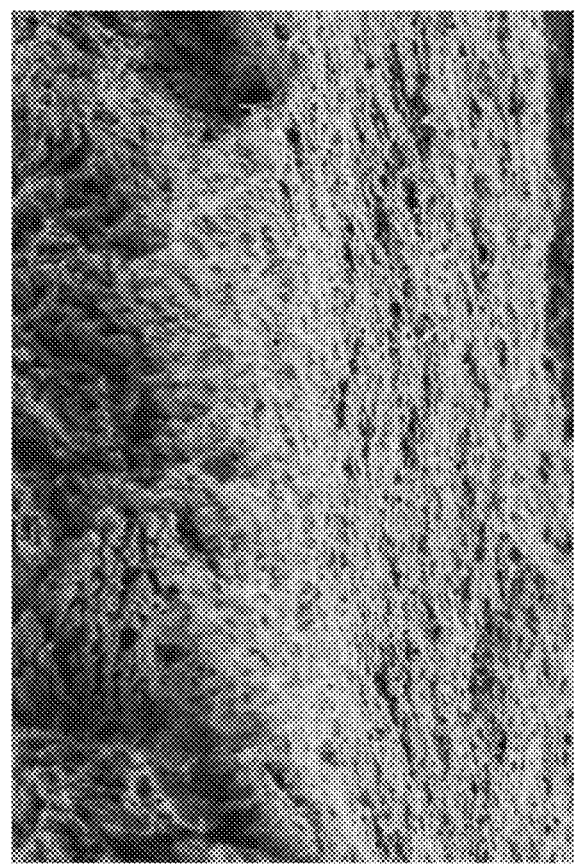
Figure 13D:
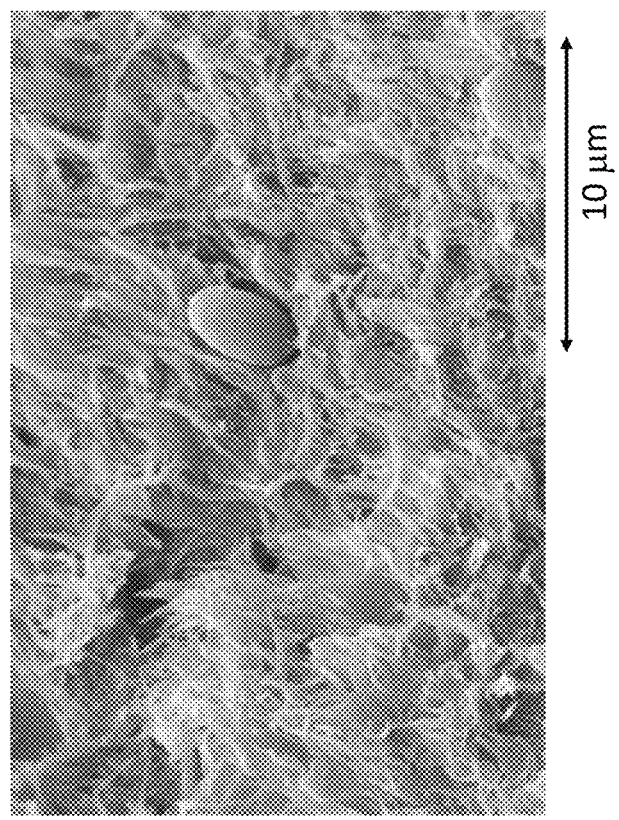
Figure 13C:

SEM imaging further illustrated these results in FIGS. 13A-13D. FIG. 10A, supra, shows CE1 having gaps (dark areas) and defect between layers or domains of LCP. Without wishing to be bound by any particular theory, these gaps or spaces may have contributed to denting. FIG. 13A presents the morphology of LCP/PEI blends which exhibit a denser structure (fewer gaps) and FIG. 13B further reveals the island distribution of PEI spheres as an enhanced image. FIGS. 13C and 13D are magnified to show additional detail. It is believed the LCP/PEI morphology balanced stiffness and ductility of the formulations when the material surface experiences a sudden external force such as ball drop. The scattered PEI domain may act as an energy absorber because PEI resin is more ductile than LCP. Furthermore, the PEI is believed to have contributed to the surface resilience because of elasticity of the polymer.

Weldline strength. Weldline strength was tested as a measure of stress at break using a universal testing machine (UTM) at 5 millimeters per second (mm/s) for CE1, Ex5, and Ex6 on 8 mm wide samples having a thickness of 0.6 mm. Values are shown FIG. 14. Ex5 and Ex6 each showed improved weldline strength compared to CE1. Ex5 exhibited 16% improvement compared to CE1.

The specific combination of LCP, PEI, compatibilizer, and specific amounts of filler, such as mica, provided a balanced material that achieved improved anti-dent, particle release, and weldline performance.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

It will be apparent to those skilled in the art that various modifications and variations can be made in the present disclosure without departing from the scope or spirit of the disclosure. Other aspects of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

What is claimed is:

1. A composition comprising:
   from about 50 wt % to about 85 wt % of a liquid crystal polymer resin;
   from about 0.1 wt % to about 15 wt % of a polyetherimide polymer;
   from about 0.05 wt % to about 8 wt % of a compatibilizer; and
   from about 2 wt % to about 25 wt % of a mineral filler,
   wherein the combined weight percent value of all components does not exceed 100 wt %, all weight percent values are based on the total weight of the composition, and
   wherein a 50 mm (millimeter)×60 mm sample having a thickness of 0.6 mm molded from the composition exhibits an anti-dent performance characterized by a dent depth from 30-40 μm (micrometers) as measured using a three dimensional surface profiler, wherein the sample is tested using a drop tester with a 1.6 mm diameter steel ball having a weight of 50 grams dropped from a height of 50 mm.

2. The composition according to claim 1, wherein the liquid crystal polymer resin comprises a polyether resin.

3. The composition according to claim 1, wherein the liquid crystal polymer resin comprises a liquid crystalline polyether resin derived from 4-hydroxybenzoic acid and 6-hydroxy-2-naphthoic acid.

4. The composition according to claim 1, wherein the mineral filler comprises talc, clay, mica, wollastonite, titanium dioxide, or a combination thereof.

5. The composition according to claim 1, wherein the mineral filler is mica.

6. The composition according to claim 1, wherein the polyetherimide has a weight average molecular weight of 47,000 and a number average molecular weight of 19,000 g/mol.

7. The composition according to claim 1, wherein the polyetherimide is present in an amount from about 7.5 wt % to about 10 wt %.

8. The composition according to claim 1, wherein the compatibilizer comprises an epoxy-functionalized block copolymer.

9. The composition according to claim 1, wherein the compatibilizer comprises an ethylene glycidyl methacrylate (EGMA) copolymer.

10. The composition according to claim 1, wherein the compatibilizer comprises repeating units derived from (a) ethylene and glycidyl methacrylate; (b) ethylene, a C1-6 alkyl acrylate, and glycidyl acrylate; (c) ethylene, methyl acrylate, and glycidyl acrylate; (d) ethylene, butyl acrylate, and glycidyl acrylate; or (e) ethylene, vinyl acetate, or glycidyl acrylate.

11. The composition according to claim 1, wherein the compatibilizer comprises an ethylene-glycidyl methacrylate copolymer, an ethylene-glycidyl methacrylate-methyl acrylate terpolymer, an ethylene-glycidyl methacrylate-vinyl acetate terpolymer, or an ethylene-glycidyl methacrylate copolymer.

12. The composition according to claim 1, further comprising an additive material selected from the group consisting of: a metal deactivator; an acid scavenger; an antioxidant; a colorant; a dye; a flow promoter; a flow modifier; an impact modifier; a lubricant; a mold release agent; a pigment; a quenching agent; a thermal stabilizer; an ultraviolet (UV) absorbant; a UV reflectant; a UV stabilizer; a flame retardant; and combinations thereof.

13. The composition according to claim 12, wherein the additive material comprises a pigment comprising carbon black.

14. An article formed from the composition of claim 1, wherein the article is a component of a mobile compact camera module.

15. A method of forming a composition, the method comprising:
(a) combining, to form a mixture
  i. from about 50 wt % to about 85 wt % of a liquid crystal polymer resin,
  ii. from about 0.1 wt % to about 15 wt % of a polyetherimide polymer,
  iii. from about 0.05 wt % to about 8 wt % of a compatibilizer, and
  iv. from about 2 wt % to about 25 wt % of a mineral filler; and
(b) extruding the mixture to form the composition,
wherein the combined weight percent value of all components does not exceed 100 wt %, and all weight percent values are based on the total weight of the composition, and
wherein a 50 mm×60 mm sample having a thickness of 0.6 mm molded from the composition exhibits an anti-dent performance characterized by a dent depth from 30-40 micrometers as measured using a three dimensional surface profiler, wherein the sample is tested using a drop tester with a 1.6 mm diameter steel ball having a weight of 50 grams dropped from a height of 50 mm.

* * * * *